United States Patent
Sardesai (12)

(10) Patent No.: US 6,259,845 B1
(45) Date of Patent: Jul. 10, 2001

(54) DISPERSION COMPENSATING ELEMENT HAVING AN ADJUSTABLE DISPERSION

(75) Inventor: Harshad P. Sardesai, Elkridge, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/137,408

(22) Filed: Aug. 20, 1998

(51) Int. Cl.[7] ........................................... G02B 6/02
(52) U.S. Cl. .................. 385/123; 385/24; 359/161; 359/341
(58) Field of Search ................ 385/123, 24; 359/133, 359/341, 161

(56) References Cited

U.S. PATENT DOCUMENTS

| | | | |
|---|---|---|---|
| 5,224,183 | * 6/1993 | Dugan | 385/24 |
| 5,524,144 | * 6/1996 | Suzuki | 359/176 |
| 5,608,562 | 3/1997 | Delavaux et al. | 359/161 |
| 5,636,046 | 6/1997 | Hiroshi et al. | 359/161 |
| 5,778,128 | * 8/1999 | Wildeman | 385/123 |
| 5,877,879 | * 3/1999 | Naito | 359/133 |
| 5,940,208 | * 8/1999 | Blaszyk et al. | 359/341 |

FOREIGN PATENT DOCUMENTS 0902558  3/1999  (EP).

OTHER PUBLICATIONS

Sano, A., et al., "Automatic dispersion equalization by monitoring extracted clock power level in a 40–Gbit/s 200–km transmission line," 22nd European Conference on Optical Communication ECOC, pp. 207–210, 1996 No month.

* cited by examiner

*Primary Examiner*—Rodney Bovernick
*Assistant Examiner*—Ellen E. Kim
(74) *Attorney, Agent, or Firm*—David L. Soltz

(57) ABSTRACT

In accordance with the present invention, a dispersion compensation module is coupled to a transmission optical fiber. The dispersion compensation module includes segments of optical fiber of varying length, some of which have a positive dispersion while other have a negative dispersion. Selected optical fiber segments are coupled to one another to provide a desired net dispersion to offset the dispersion associated with the transmission optical fiber. Thus, rather than provide a unique segment of DCF for each span, the same dispersion compensation module can be used for spans of varying length and fiber types by simply connecting appropriate segments of fiber within the module.

12 Claims, 4 Drawing Sheets

DISPERSION COMPENSATING ELEMENT HAVING AN ADJUSTABLE DISPERSION

FIELD OF THE INVENTION

The present invention is directed toward optical communication systems incorporating dispersion compensation and particularly such systems having an adjustable amount of dispersion compensation and to components of such systems.

BACKGROUND OF THE INVENTION

Optical signals transmitted in a fiber optic communication system typically constitute a series of pulses of digital information. Although the pulses are usually at a single nominal wavelength, each pulse is actually composed of different spectral components. The spectral components of each pulse propagate through the transmission fiber at different speeds with higher frequency components traveling slower than lower frequency components in non-dispersion shifted optical fiber. This effect, known as "chromatic dispersion", can result in spectral components of one pulse arriving at a receiver at substantially the same time as a succeeding pulse, thereby causing degraded receiver sensitivity. Chromatic dispersion becomes increasingly pronounced at higher bit rates, e.g. those associated with synchronous optical network (SONET) OC-192 transmission speeds.

Typically, optical signals propagating through transmission optical fiber experience a positive dispersion. Accordingly, dispersion compensated fiber (DCF) having a negative dispersion can be coupled to the transmission optical fiber in order to offset the chromatic dispersion thereof. The amount of dispersion experienced by an optical signal depends on the distance traveled through the transmission optical fiber. Shorter lengths of transmission optical fiber require less compensation than longer lengths. Likewise, longer lengths of DCF are used when more compensation is required, and shorter lengths of DCF are provided when less compensation is needed. Each segment of transmission optical fiber, however, requires a unique length of DCF in order to provide an appropriate amount of dispersion compensation.

In a fiber optic network, many different lengths or spans of transmission optical fiber are used to connect various points within the network. According to the conventional approach to dispersion compensation described above, a unique length of DCF must be cut for each span. If the network contains many spans, a corresponding number of DCF fibers must be provided, each having a different length. As a result, the conventional approach to dispersion compensation in such instances can be inefficient and time consuming.

SUMMARY OF THE INVENTION

Consistent with the present invention, a dispersion compensation module is provided comprising a first optical fiber having a positive dispersion and a second optical fiber having a negative dispersion. One of the first and second optical fibers is configured to be coupled to a transmission optical fiber. The first and second optical fibers are selectively coupled to each other in order that the dispersion compensation module have a desired amount of dispersion to thereby compensate a dispersion associated with the transmission optical fiber.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

In accordance with the present invention, a dispersion compensation module is coupled to a transmission optical fiber. The dispersion compensation module includes segments of optical fiber of varying length, some of which have a positive dispersion while other have a negative dispersion. Selected optical fiber segments are coupled to one another to provide a desired net dispersion to offset the dispersion associated with the transmission optical fiber. Thus, rather than provide a unique segment of DCF for each span, the same dispersion compensation module can be used for spans of varying length and fiber types by simply connecting appropriate segments of fiber within the module.

Figure 1:
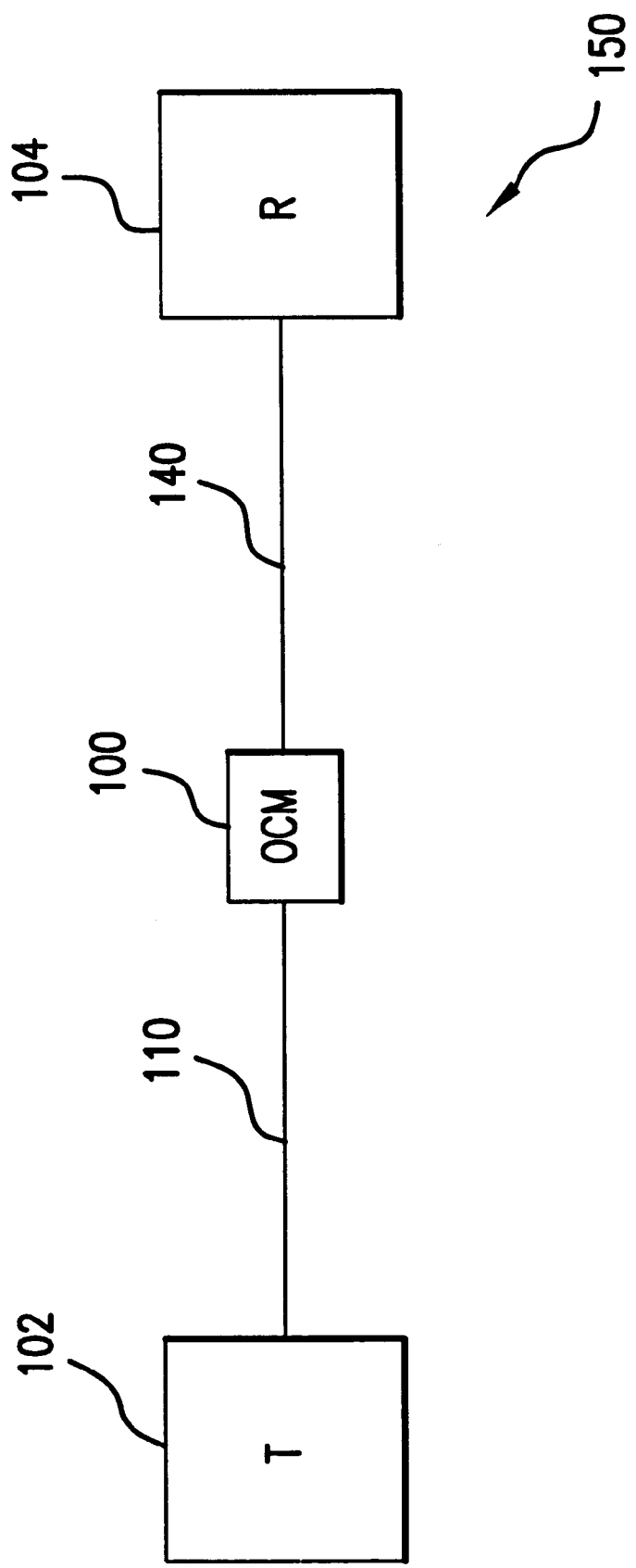
FIG. 1 illustrates a block diagram of a fiber optic transmission system incorporating a dispersion compensating module in accordance with the present invention.

Turning to the drawings in which like reference characters indicate the same or similar elements in each of the several views, FIG. 1 illustrates a block diagram of an optical communication system 150 including a dispersion compensation module 100 in accordance with the present invention. Optical signals are emitted from transmitter 102 including a directly or externally modulated laser. The optical signals propagate through transmission fiber 110 and experience chromatic dispersion, an amount of which corresponding to the length of transmission fiber 110. The optical signals are fed to dispersion compensating module 100, which offsets or compensates the dispersion associated with fiber 110. The dispersion compensated optical signals are next output from dispersion compensation module 100 and supplied via fiber 140 to optical receiver 104, including, for example, a photodetector and associated circuitry.

Figure 2:
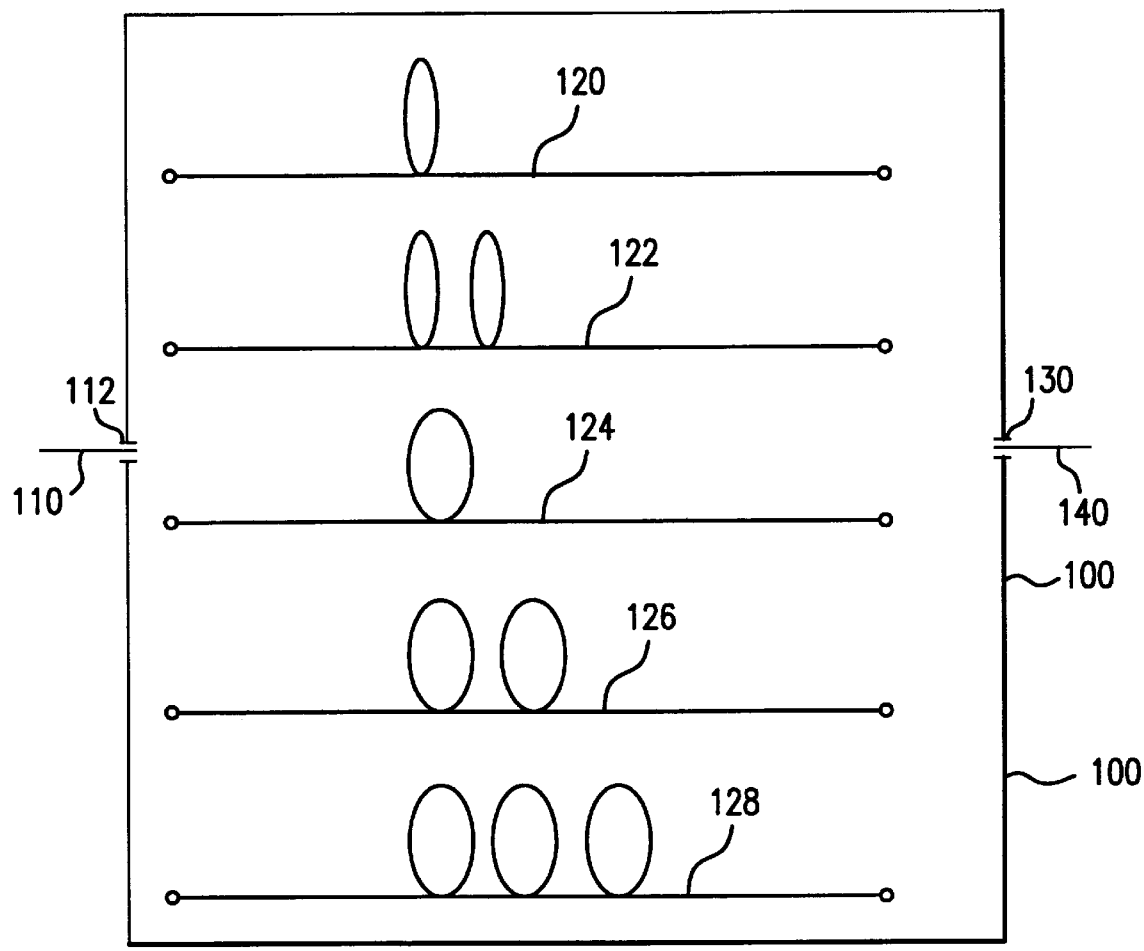
FIG. 2 illustrates a schematic diagram of a dispersion compensating module in accordance with an embodiment of the present invention.

FIG. 2 illustrates dispersion compensation module 100 in further detail. Module 100 is coupled to transmission optical fiber 110 via input port 112. Transmission fiber 110 can include conventional non-dispersion shifted fiber (NDSF), LS® fiber (available from Corning), Truewave® fiber (available from Lucent) or LEAF® fiber (available from Corning). Module 100 includes first segments of optical fiber 120 and 122 having a positive dispersion, for example, and second segments of optical fiber 124, 126 and 128 having a negative dispersion. Optical connecting elements (not shown in FIG. 2), such as optical patch cord or an additional segment of optical fiber can be used to couple selected segments of optical fiber to transmission fiber 110 so that the net dispersion associated with the connected fiber segments is substantially equal in magnitude, but opposite in sign, to the dispersion associated with transmission fiber 110. In which case, dispersion compensation can be achieved. If necessary, one of the selected optical fiber segments within module 100 is coupled to an additional transmission optical fiber 140 through port 130 to thereby supply dispersion compensated optical signals for output.

Each of fiber segments 120 and 122 can include non-dispersion shifted fiber (NDSF), having a positive dispersion, while fiber segments 126 and 128 can each comprise DCF, commercially available from Coming, for example. Fibers 120 and 122 have different lengths, and fibers 124, 126 and 128 also have different lengths, so that each has a different dispersion. Since module 100 comprises fibers having both positive and negative dispersion, a net dispersion having a finer granularity than that associated with a module consisting only of segments of DCF can be achieved. Moreover, the present invention can provide dispersion compensation when the input transmission fiber has a negative dispersion i.e., the dispersion compensation module can have a net positive dispersion.

Figure 3:
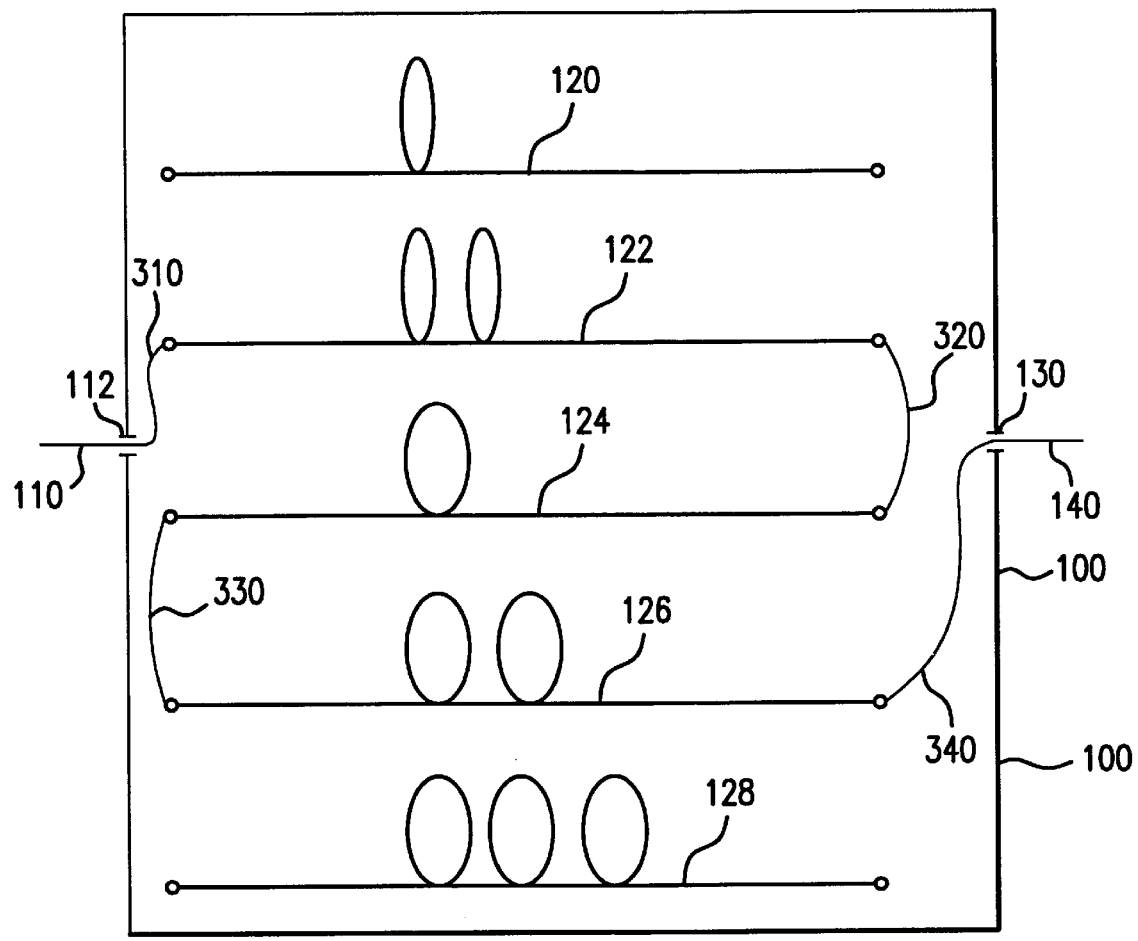
FIG. 3 illustrates an exemplary configuration of the dispersion compensating module shown in FIG. 2.

An exemplary dispersion compensation module configuration will next be described with reference to FIGS. 3 and 4. In FIG. 3, transmission optical fiber includes 65 km of commercially available Truewave® optical fiber having an average dispersion per kilometer at 1550 nm of 2 ps/nm km, resulting in a total dispersion of 65 km×2 ps/nm km=130 ps/nm. Moreover, optical fibers 120, 122, 124, 126 and 128 have the following average dispersions at 1550 nm listed in Table 1.

TABLE 1

| Fiber | 120 | 122 | 124 | 126 | 128 |
|---|---|---|---|---|---|
| Dispersion | −165 ps/nm | −330 ps/nm | +66 ps/nm | +132 ps/nm | +264 ps/nm |

Thus, by selectively coupling fibers 122, 124 and 126, the net dispersion associated with module 100 is −132 ps/nm (−330 ps/nm+66 ps/nm+132 ps/nm), which is sufficient to offset the+130 ps/nm dispersion associated with transmission fiber 110 in this case. It is noted that by appropriately connecting selected optical fibers within the module shown in FIG. 3, as well as in FIG. 4 below, desired average dispersions at 1550 nm within a dispersion range of −495 ps/nm to 462 ps/nm can be achieved in steps of 33 ps/nm over much of the range (−330 ps/nm to +33 ps/nm) and with a step size of 66 ps/nm over the rest of the range. Accordingly, dispersion compensation can be obtained for a wide range of transmission fiber types and lengths. If a step size of 33 ps/nm over the entire range is desired, an additional fiber having a positive dispersion of+33 ps/nm can be provided in module 100.

Generally, the range of net dispersions achievable with module 100 can be controlled by adjusting the length of the module fibers. In particular, if each of the module fibers is extended by a given factor, the dispersion range expands by the same factor, but the increments or steps within that range also increases by the same factor. For example, the range of net dispersions can be increased by a factor of two by doubling the length of each of the fibers within module 100. Such an expanded range, however, is obtained with larger steps, e.g., steps of 66 ps/nm in the above example as opposed to+33 ps/nm. On the other hand, if the length of the module fibers is reduced by a given factor, the net dispersion range is reduced by the same factor, but dispersion values within the range are separated by smaller steps. Appropriate fiber length factors can be selected depending on the amount of compensation and the accuracy required (i.e., the desired step size).

FIG. 3 further schematically illustrates optical connecting element 310, which couples transmission fiber 110 to fiber 122; connecting element 320, which couples optical fiber 122 to optical fiber 124; and connecting element 330, which couples optical fiber 124 to optical fiber 126. An additional optical connecting element 340 couples fiber 126 with transmission fiber 140 to thereby output dispersion compensated optical signals.

Figure 4:
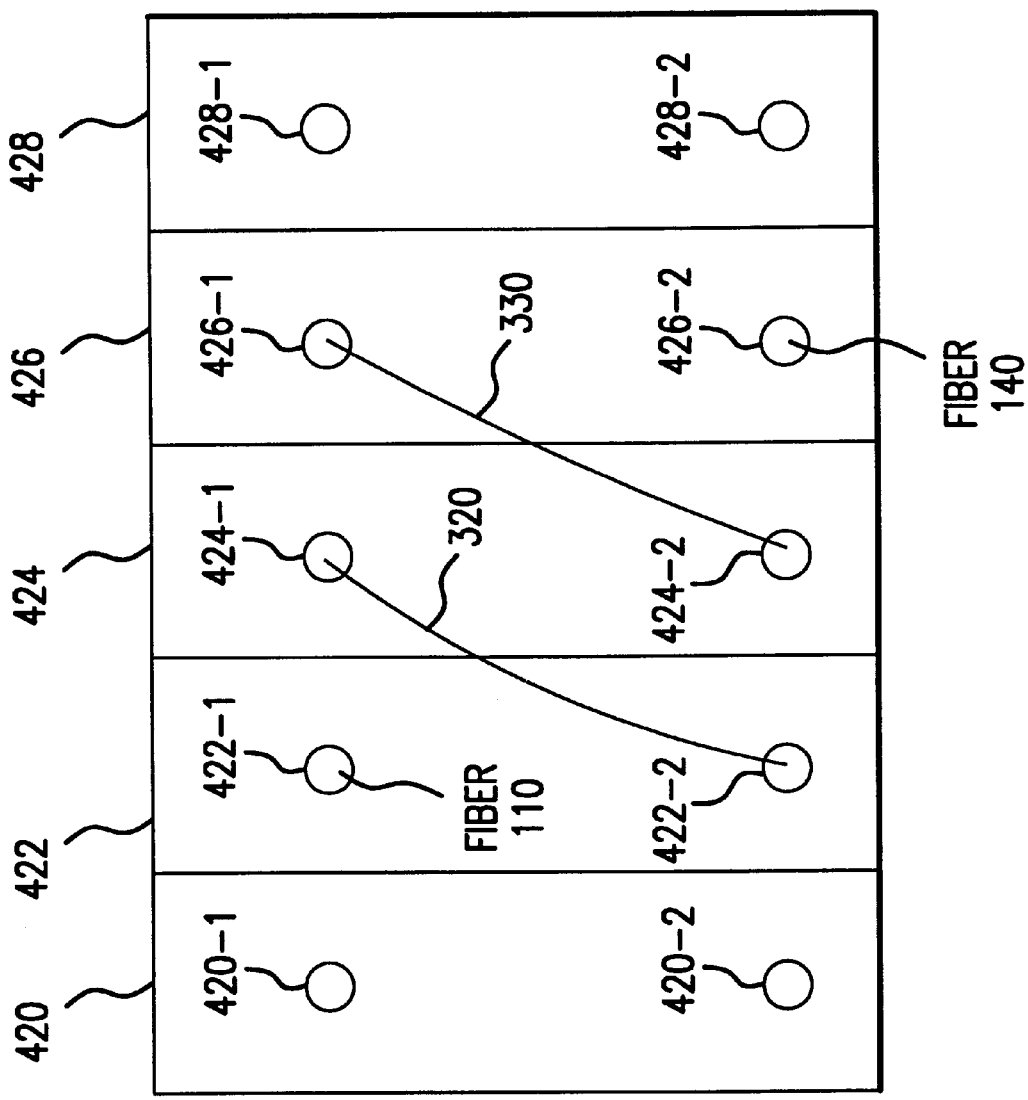
FIG. 4 illustrates an exemplary configuration of a dispersion compensating module in accordance with an additional embodiment of the present invention.

A further exemplary embodiment is illustrated in FIG. 4 illustrating a frontal view of an alternative dispersion compensating module 400. Dispersion compensating module 400 comprises subsections 420, 422, 424, 426 and 428, housing a respective one of fibers 120, 122, 124, 126 and 128. Each subsection further includes a respective one of input ports 420-1, 422-1, 424-1, 426-1 and 428-1, and a respective one of output ports 420-2, 422-2, 424-2, 426-2 and 428-2. Each input and output port is respectively connected to an end portion of the housed fiber. For example, input port 420-1 is coupled to a first end of fiber 120 while output port 420-2 is connected to a second end portion. Optical connecting elements can be connected to the input an output ports in order to obtain the desired net dispersion. However, in the embodiment shown in FIG. 4, the user need only make connections on the face of the module. There is no need to make connections within the module as shown in FIG. 3.

The exemplary configuration shown in FIG. 4 further provides the same level of dispersion compensation as in the embodiment shown in FIG. 3. Namely, fiber 110 is coupled to input port 422-1 of subsection 422 housing fiber 122. Output port 422-2 of subsection 422 is coupled to input port 424-1 of subsection 424 via optical connecting element 320. Optical connecting element 330 provides a connection between output port 424-2 and input port 426-1. Lastly, output port 426-2 is coupled to fiber 140. Thus, optical signals propagating through fiber 110 are passed through fibers 122, 124 and 126, and the dispersion thereof is compensated as in the example shown in FIG. 3.

While the foregoing invention has been described in terms of the embodiments discussed above, numerous variations are possible. Accordingly, modifications and changes such as those suggested above, but not limited thereto, are considered to be within the scope of the following claims. For example, although the negative dispersion fiber is coupled to the input optical signals in the above-described embodiments, the optical fibers within the dispersion compensating module can be connected to one another in any order so long as the net dispersion achieved provides the necessary compensation. Moreover, although the above exemplary modules included a total of five fibers, any appropriate number of fibers can be provided within the module in order to obtain the desired dispersion compensation.

What is claimed is:

1. An optical device, comprising:

a housing;

a plurality of first optical fibers, each having a positive dispersion;

a plurality of second optical fibers, each having a negative dispersion, said first and second pluralities of optical fibers being provided inside said housing; and at least one optical connecting element provided external to said housing, said at least one optical connecting element coupling selected optical fibers from said pluralities of first and second optical fibers to thereby provide a desired net dispersion compensation.

2. An optical device in accordance with claim 1, wherein each of said plurality of first optical fibers comprises non-dispersion shifted fiber.

3. An optical device in accordance with claim 1, wherein each of said plurality of second optical fibers comprises dispersion compensated fiber (DCF).

4. An optical device in accordance with claim 1, wherein said housing further comprises:

an optical input port coupled to said selected optical fibers and a third optical fiber, said third optical fiber having a positive dispersion, said selected optical fibers having a net negative dispersion to thereby compensate said positive dispersion of said third optical fiber.

5. An optical device in accordance with claim 1, wherein said housing further comprises:

an optical input port coupled to said selected optical fibers and a third optical fiber, said third optical fiber having a negative dispersion, said selected optical fibers having a net positive dispersion to thereby compensate said negative dispersion of said third optical fiber.

6. An optical device in accordance with claim 1, wherein each of said plurality of first optical fibers has a different length and different magnitude of dispersion.

7. An optical device in accordance with claim 1, wherein each of said plurality of second optical fibers has a different length and different magnitude of dispersion.

8. A method of manufacturing an optical communication apparatus, comprising the steps of:

determining a level of dispersion associated with an optical transmission fiber;

providing a plurality of first optical fibers, each of which having a positive dispersion, inside a housing;

providing a plurality of second optical fibers, each of which having a negative dispersion, inside a housing; and coupling through at least one connection external to said housing selected optical fibers from said pluralities of first and second optical fibers to provide a desired net dispersion to compensate said level of dispersion associated with said optical transmission fiber.

9. A method in accordance with claim 8, wherein said each of said plurality of first optical fibers comprises non-dispersion shifted fiber.

10. A method in accordance with claim 8, wherein said each of said plurality of second optical fibers comprises dispersion compensated fiber.

11. A method in accordance with claim 8, further comprising the step of adjusting a length associated with each of said plurality of first optical fibers so that each of said plurality of first optical fibers has a different magnitude of dispersion.

12. A method in accordance with claim 8, further comprising the step of adjusting a length associated with each of said plurality of second optical fibers so that each of said plurality of second optical fibers has a different magnitude of dispersion.

\* \* \* \* \*